United States Patent
Liang

(10) Patent No.: US 6,927,882 B2
(45) Date of Patent: Aug. 9, 2005

(54) METHOD OF PRODUCING A LIGHT SOURCE COMPENSATING ELEMENT

(75) Inventor: Nai-Yueh Liang, Taipei (TW)

(73) Assignee: Benq Corporation, Taoyuan (TW)

( * ) Notice: Subject to any disclaimer, the term of this patent is extended or adjusted under 35 U.S.C. 154(b) by 140 days.

(21) Appl. No.: 10/386,961

(22) Filed: Mar. 12, 2003

(65) Prior Publication Data
US 2003/0189737 A1 Oct. 9, 2003

Related U.S. Application Data

(62) Division of application No. 09/373,178, filed on Aug. 12, 1999, now Pat. No. 6,621,601.

(30) Foreign Application Priority Data

Aug. 17, 1998 (TW) ........................................ 87113508 A

(51) Int. Cl.⁷ ............................. H04N 1/04; H04N 1/00; H04N 1/46
(52) U.S. Cl. ........................ 358/475; 509/487; 509/506; 509/406; 509/504
(58) Field of Search ................................. 358/406, 504, 358/522, 274, 168, 475, 509, 484, 461, 487, 506, 305; 362/351; 359/601, 614; 430/24, 30, 5, 198; 355/71, 69, 67; 396/155, 164, 546; 348/96, 97, 98; 382/312, 318, 319, 274; 428/212

(56) References Cited

U.S. PATENT DOCUMENTS

| | | | | |
|---|---|---|---|---|
| 4,845,570 A | | 7/1989 | Uchiyama | 358/496 |
| 4,897,730 A | * | 1/1990 | Iwahara et al. | 348/261 |
| 5,535,021 A | | 7/1996 | Chiang et al. | 358/474 |
| 5,798,849 A | | 8/1998 | Tsai | 358/475 |
| 6,447,963 B2 | * | 9/2002 | Wakasono | 430/24 |
| 6,587,288 B2 | * | 7/2003 | Erz et al. | 359/885 |
| 6,790,583 B2 | * | 9/2004 | Kawazu | 430/198 |

* cited by examiner

Primary Examiner—Cheukfan Lee
(74) Attorney, Agent, or Firm—Ladas & Parry LLP

(57) ABSTRACT

This invention discloses a method of producing a light source compensating element for adjusting the brightness distribution of light projected from a light source of a scanner onto a scanned object. The light source compensating element produced in accordance with this invention can be arranged between the scanner light source and the scanned object, thereby obtaining an even (or uniform) brightness distribution on the scanned object. In addition, compensating element with specific transmittance distribution can also be produced and placed between the light source of the scanner and the scanned object, whereby the light emitted from the light source through the compensating element has a specific brightness distribution on the scanned object.

7 Claims, 4 Drawing Sheets

METHOD OF PRODUCING A LIGHT SOURCE COMPENSATING ELEMENT

This is a divisional of U.S. Ser. No. 09/373,178 filed on 12 Aug. 1999, now U.S. Pat. No. 6,621,601.

DESCRIPTION OF THE INVENTION

This invention relates to a method of producing a compensating element, particularly to a method of producing a light source compensating element for scanners. The acquired light source compensating element can be arranged between the light-radiating device (the light source) of a scanner and the document text page (the scanned object) for compensating the light emitted from the light source, thereby forming specific (or even) brightness distribution of light projected onto the surface of the scanned object. The scanner configured with the light source compensating element is also disclosed.

BACKGROUND OF THE INVENTION

A typical scanning apparatus comprises a light-radiating device for moving along a scanning path to illuminate an object or document (for example, a piece of paper or a transparency) and projecting the scanned image of the scanned object through a focusing device to a receiving device (such as a charge-coupled device (CCD), or a contact image sensor (CIS)). However, the brightness distribution of light emitted from the light-radiating device to the surface of the scanned object will become uneven due to the properties of the light source. Consequently, the image quality projected to the image receiving device will be degraded.

Please refer to FIG. 1. In a typical CIS scanner, the light-radiating device (light source) comprises an LED 10 with a light guide 12. The LED 10 emits light, which transmits along the light guide 12 and is projected onto the scanned object. The light brightness distribution onto the text page of the scanned object 14 is shown in FIG. 1. In FIG. 1, $I_{max}$ and $I_{min}$ represent the maximum and the minimum brightness, respectively, whereas $I_m$ is defined as $$\frac{I_{max} + I_{min}}{2}$$

to represent the average brightness. The unevenness of light brightness distribution is defined as $$\frac{I_{max} - I_m}{I_m} \times 100\%.$$

Currently, the unevenness of the light distribution on the surface of the scanned object may be resolved by configuring the geometric structure of the light guide 12 to make the light projected by the LED through the light guide more even (uniform). However, the result achieved is not always satisfactory. Another resolution is to first drive the light source in a CIS scanner to scan an even blank (white element). The scanned data then serves as a reference white. In later scanning of other documents, the scanned data of other documents will be compared with the corresponding value of the reference white to obtain image data approximate to the source documents. However, this method will reduce the image quality of the darker areas on the source documents.

SUMMARY OF THE INVENTION

Accordingly, an object of this invention is to provide a method of producing a light source compensating element for scanners. The light source compensating element fabricated in accordance with this invention can be arranged between the scanner light source (the light-radiating device) and the scanned object. Therefore, the light emitted from the light source passing through the light source compensating element has even (uniform) brightness distribution on the scanned object.

Another object of this invention is a method of producing light source compensating elements for scanners. The light emitted from the light source through the light source compensating element has a desired (predetermined and specific to user's requirement) brightness distribution of light on the scanned object.

Yet another object of this invention is to provide an image scanning apparatus, characterized in that it comprises a light source compensating element for adjusting the brightness distribution of the light projected onto a scanned object. The light source compensating element is arranged between the light-radiating device and the scanned object, for enabling the light passing through the compensating element to have a specific (or even) brightness distribution on the scanned object.

To achieve the above object of projecting evenly distributed light onto the surface of a scanned object through a light source compensating element, this invention provides a method of producing a light source compensating element for scanners, comprising: providing an unexposed target film; projecting the light from the light source of the scanner to the target film and controlling the time of exposing the target film; and developing the exposed target film to obtain low transmittance distribution on the target film corresponding to the higher brightness distribution of the light used to expose the target film and high transmittance distribution on the target film corresponding to the lower brightness distribution of the light used to expose the target film. The production of a light source compensating element is then completed.

To achieve the object of the projecting specific light distribution (brightness distribution) onto the surface of a scanned object through light source compensating element, this invention provides the method of producing light source compensating element for scanners, comprising the following steps.

First, provide an unexposed target film and a characteristic curve; wherein the characteristic curve shows the transmittance of the target film after being exposed versus the light brightness exposing the target film.

Second, determine the required transmittance distribution on the target film in accordance with (a) a predetermined and desired brightness distribution projected onto the surface of a scanned object and (b) the brightness distribution of the scanning light projected directly onto the surface of the scanned object.

Next, expose the target film by using an even light source of adjustable brightness; wherein the brightness of the even light source is adjusted in reference with the characteristic curve, to have the required brightness for exposing the target film, thereby obtaining the required transmittance distribution on the target film.

Finally, develop the target film to form the light source compensating element.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE EMBODIMENTS

Figure 1:
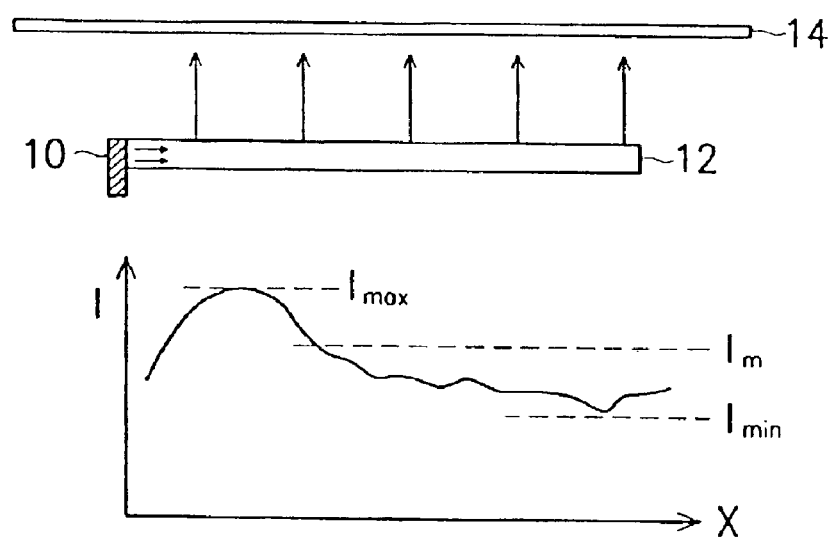
FIG. 1 is a diagram illustrating the distribution of the light of a CIS light source projected onto the surface of the scanned object.
Figure 2:
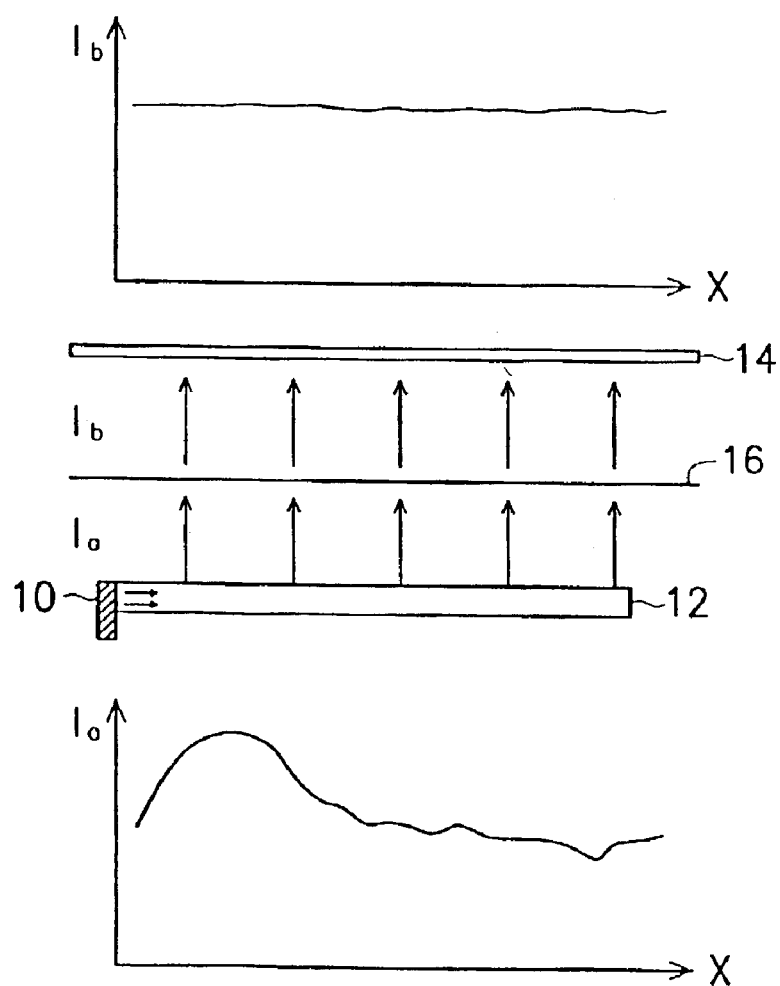
FIG. 2 is a diagram illustrating the function of the compensating element of this invention.

Referring to FIG. 2, the compensating element 16 produced in accordance with this invention is arranged between the CIS light source (LED 10 and light guide 12) and a scanned object 14 of a scanner, so the uneven light distribution $I_a$ emitted from the CIS light source can be corrected to result in a more even light distribution $I_b$ (or specific light distribution, not shown in the Figure) on the document text page of the scanned object. The method of producing the compensating element is specified as follows.

I. Method of Producing Compensating Element for Obtaining Even Brightness Distribution of Light The method of producing a light source compensating element for rendering an even brightness distribution for light emitted through the compensating element onto the document page (scanned object) is described as follows.

Figure 3A:
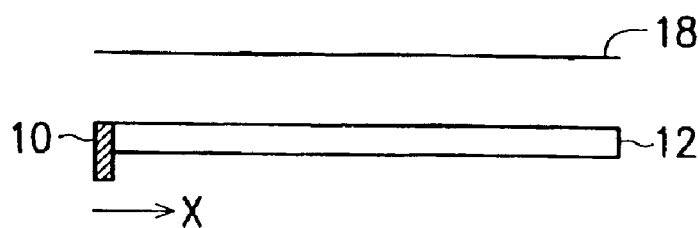
FIGS. 3(a) to 3(d) are diagrams respectively illustrating the arrangement of exposing the film by the CIS light source, the brightness distribution of the light projected from the CIS light source, transmittance distribution on the film, and the light brightness distribution of the CIS light after compensation.

As shown in FIG. 3(a), a light-radiating device (light source) of a scanner is used to expose an unexposed black-and-white film 18. In this embodiment, the light-radiating device is a CIS lighting device (comprising an LED 10 and a light guide 12).

Figure 3B:

The power-on time of the LED 10 to emit light for exposing the film 18 is controlled. The brightness distribution of the light emitted from the light source on the film 18 is shown in FIG. 3(b), wherein along the x axis the brighter area on the film 18 will receive higher light exposure and the darker area on the film 18 will receive lower light exposure.

Figure 3C:

After the exposed film 18 is developed, the compensating element is then completed. On the developed film 18 (compensating element), the higher exposure areas have darker color and thus have lower transmittance; the lower exposure areas have lighter color and thus have higher transmittance. The transmittance of the exposed film 18 along the x axis is shown in FIG. 3(c). Therefore, the compensating element 18 has a low transmittance corresponding to high light brightness, and has a high transmittance corresponding to low light brightness.

Figure 3D:
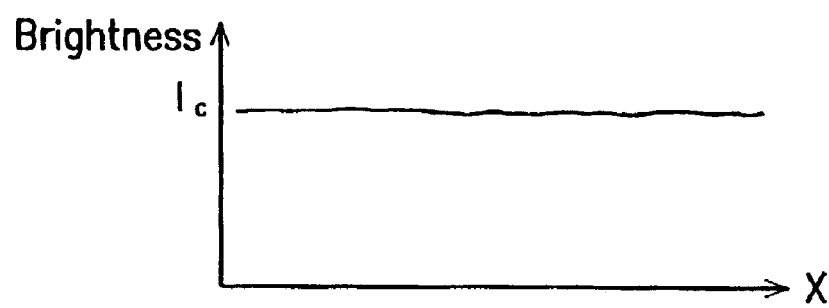

Consequently, the transmittance of the compensating element 18 corresponding to the locations on a scanning line (x axis) is in inverse proportion to the brightness distribution ($I_a$) on the surface of the scanned object when the lighting device directly projects light to the scanned object. Hence, the brightness distribution ($I_c$) of light projected from the light source through the compensating element 18 will be more even on the surface of the scanned object, as shown in FIG. 3(d).

II. Method of Producing Compensating Element for Obtaining Specific Brightness Distribution of Light (1) First, a target film and a characteristic curve are provided to fabricate a light compensating element. The characteristic curve shows the transmittance of the target film after being exposed versus the brightness of light used to expose the target film.

Figure 4A:
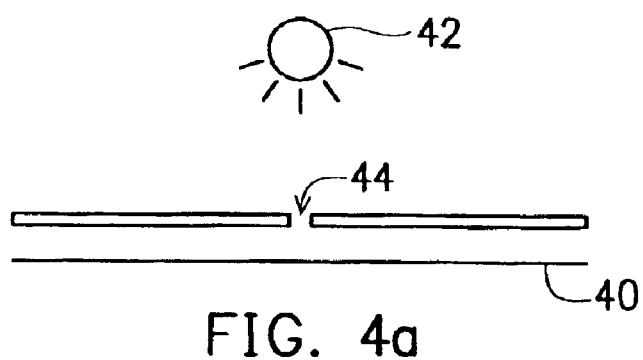
FIGS. 4(a) and 4(b) are diagrams respectively illustrating one of the possible arrangements for obtaining the characteristic curve of transmittance of a film versus the brightness distribution of light used to expose the film, and the obtained characteristic curve.
Figure 4B:
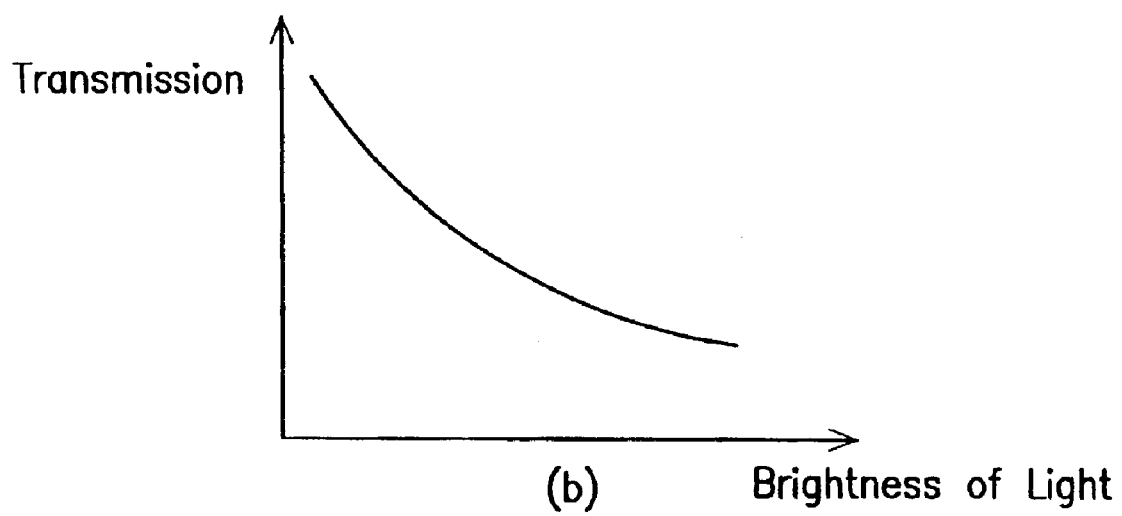

The characteristic curve is obtained by way of the following steps: Provide an unexposed reference film 40 and an even light source 42 with controllable brightness. Vary the brightness of the light source 42, and in the meanwhile expose different areas of the reference film 40 to the light emitted by the light source 42 through a narrow gap 44 for a fixed period of time, as shown in FIG. 4(a). Develop the reference film 40 by fixed (or general) processes, and measure the transmittance of the reference film 40 exposed under light of variable brightness to obtain the characteristic curve, as shown in FIG. 4(b).

Next, determine a specific transmittance distribution (on a scanning line or the x axis) of a target film in accordance with (a) a desired brightness distribution of light to be formed onto the scanned object at the scanning line and (b) the brightness distribution of the light projected from a light-radiating device of a scanner directly onto a scanned object at the scanning line.

Further, determine the corresponding transmittance distribution of a master film to be used for duplicating the compensating element, according to the desired transmittance distribution of the target film.

Figure 5:
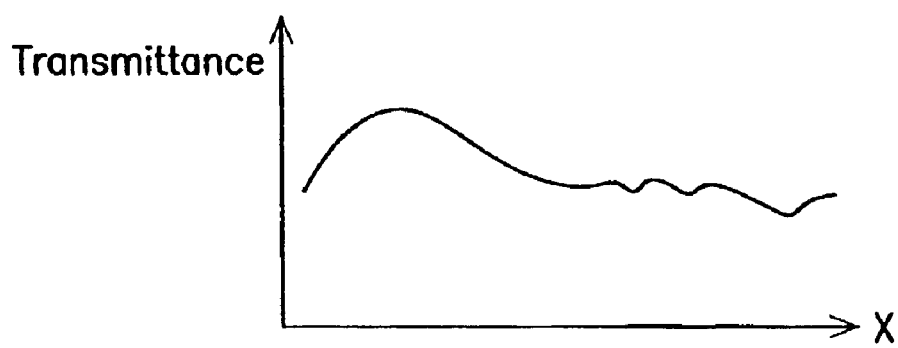
FIG. 5 is a diagram illustrating the distribution of the transmission rate on a master film.

For example, if the specific (desired) brightness distribution of light formed on the scanning line (x axis) of the document page is shown as in FIG. 3(d), whereas the light brightness distribution formed on the scanning line (x axis) by directly projecting light to the scanning line of the scanned object, is shown as in FIG. 3(b), then the transmittance distribution on the scanning line (x axis) to be formed on the compensating element (target film) can be estimated as shown in FIG. 3(c), and the transmittance distribution on the scanning line (x axis) to be produced on the master film will be shown as in FIG. 5.

(2) Next, provide an unexposed film with the identical properties as the reference film 40 as a master film.

(3) Expose the master film by using an even light source with variable brightness. The light brightness is adjusted conforming with the characteristic curve (FIG. 4(b)) with reference to the desired transmittance distribution of the master film to be produced. FIG. 5 shows the transmittance distribution of the master film.

Similarly, a target film can be exposed with reference to the characteristic curve (FIG. 4(b)) in association with the desired transmittance distribution of the target film to be produced(FIG. 3(c)) shows the transmittance distribution of the target film), by adjusting the brightness of exposure light.

Figure 6:
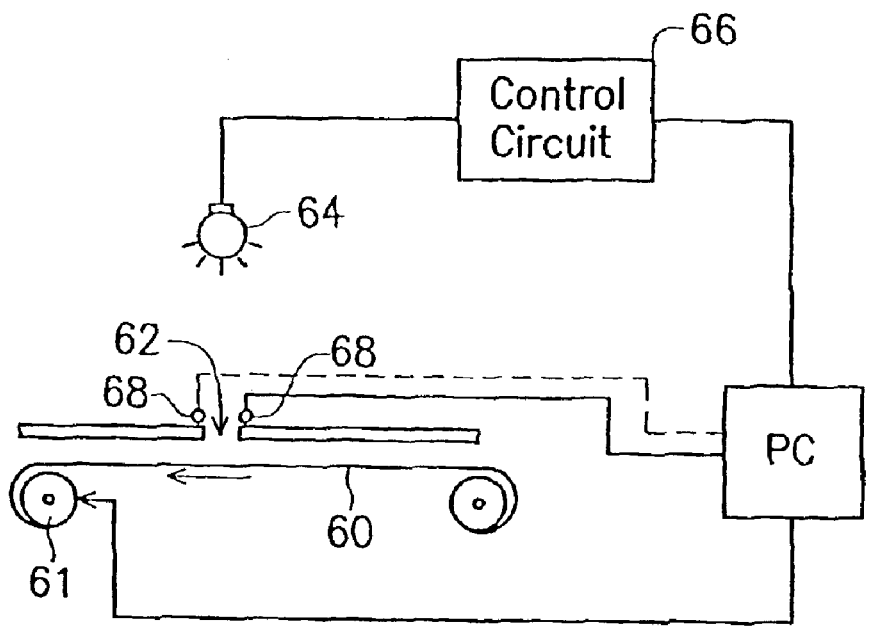
FIG. 6 is a diagram illustrating a operation platform for fabricating the light source compensating element.

The device shown in FIG. 6 is operated mainly for the light exposure of the master film or the target film. The film 60 (the master film or target film) is placed on a programmable rolling axle 61, and the scrolling speed is controlled by a PC system. A narrow gap 62 is provided in front of the film 60 for controlling the area for light exposure. One or more photodiodes 68 are arranged near the narrow gap 62 for sensing the brightness of an even light source 64 for providing feedback signals to the PC system. The PC system then acts to drive the control circuit 66 to change the brightness of the even light source 64 and exposes the film 60 to the light with various brightness according to the feedback signal, the transmittance distribution of the master film FIG. 5 (or target film FIG. 3(c)), and the characteristic curve (FIG. 4(b)).

(4) Develop the target film to complete the production of light source compensating element with the transmittance distribution as depicted in FIG. 3(c).

Or develop the master film to complete the production of a master element with a characteristic as depicted in FIG. 5 for duplicating light source compensating element the same as the developed target film.

Figure 7:
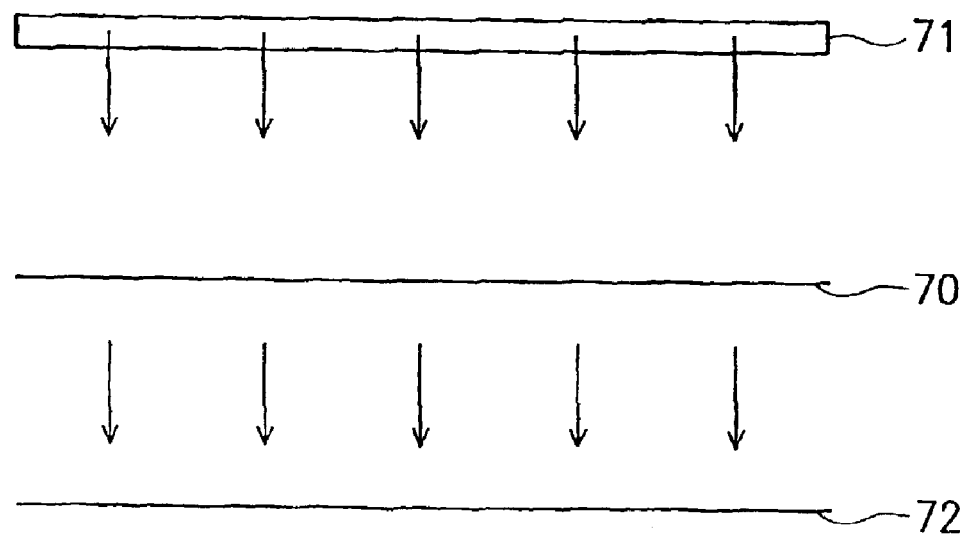
FIG. 7 is a diagram illustrating the layout for producing a compensating element by using a master element.

(5) As shown in FIG. 7, place the developed master element 70 between the even light source 71 and an unexposed destination film 72 with identical properties as the reference film 40. Then, the required light source compensating elements can be duplicated by controlling the brightness of the even light source 71 and the time for exposing the film 72 to light. The light source compensating elements duplicated from the master element 70 will have the prescribed (desired) transmittance, therefore the light passing the compensating element results in the desired brightness distribution. Therefore, the production of the light source compensating element is completed and mass production can be realized.

Moreover, by placing the developed target film between the even light source and an unexposed destination film 72 with identical properties as the reference film and then exposing and developing the destination film 72, the transmittance distribution of the destination film is inversed compared to that of the target film, and thus can serve as a master film for duplicating the light source compensating element. The duplication process is the same as described in FIG. 7.

It should be noted that for simplicity in description, the specific brightness distribution of light in this embodiment to be formed is an even distribution, however it should not be limited as such. The compensating element of this invention can be applied to form various specific brightness distributions of light, wherein the transmittance distribution on the scanning line (x axis) on the compensating element can be predetermined and produced.

This invention also provides a scanning apparatus using the compensating element as specified in the first embodiment. The apparatus comprises: a light-radiating device which is arranged on the scanning path and emits light to illuminate the scanned object and serves as the light source for reflecting the scanned object; a focusing device comprising a plurality of mirrors for collecting the reflected light from the scanned object; and an image receiving device (for example, a CCD module or a CIS module) for receiving the collected light from the focusing device to generate signals representing the image on the scanned object. The apparatus further comprises a light source compensating element being placed between the light-radiating device and the scanned object; wherein the compensating element is fabricated according to the method described in the first embodiment. As described above, the transmittance distribution of the light source compensating element is in inverse proportion to the brightness distribution of the light projected from the light-radiating device onto the surface of the scanned object without the arrangement of the compensating element, thereby enabling the light projected by the light-radiating device onto the scanned object through the light source compensating element to have an even brightness distribution.

This invention further provides another scanning apparatus using the compensating element as specified in the second embodiment. The device comprises at least: a light-radiating device which is arranged on the scanning path, emitting light to illuminate the scanned object and serving as the light source for illuminating the image on the scanned object; a focusing device comprising a plurality of mirrors for collecting the reflected light from the scanned object; and an image receiving device (for example, a CCD module or a CIS module) for receiving the collected light from the focusing device to generate signals representing the image on the scanned object. The apparatus further comprises a light source compensating element being placed between the lighting device and the scanned object. As described above, the transmittance distribution of the light source compensating element is adjusted to fit a specified distribution according to the brightness distribution of the light projected from the light-radiating device onto the surface of the scanned object without the arrangement of the compensating element, thereby enabling the light projected by the light-radiating device onto the scanned object through the light source compensating element having a desired brightness distribution.

It should be noted that the present invention can be applied to an image reading apparatus for scanning a transparency, and can also be applied to an image reading apparatus for scanning an opaque object.

Although the present invention has been described in its preferred embodiment, it is not intended to limit the invention to the precise embodiment disclosed herein. For example, the lighting device in a CIS scanner is not limited to the LED as specified in this invention, other light sources such as a light tube also apply. Those who are skilled in this technology can still make various alterations and modifications without departing from the scope and spirit of this invention. Therefore, the scope of the present invention shall be defined and protected by the following claims and their equivalents.

What is claimed is:

1. A method of producing a light source compensating element for an image reading apparatus, the image reading apparatus including a light-radiating device for emitting an illuminating light to a scanned object, said method comprising:

providing a target film and a characteristic curve of said target film, said characteristic curve shows transmittance of said target film after being exposed versus light brightness exposing said target film;

determining a required transmittance distribution on said target film in accordance with a first brightness distribution and a second brightness distribution; wherein said first brightness distribution is the brightness distribution of the illuminating light projected directly from the light-radiating device onto the scanned object, and said second brightness distribution is a predetermined brightness distribution desired to be formed onto the scanned object;

exposing said target film by a light source with adjustable brightness, wherein the brightness of said light source is adjusted with reference to said characteristic curve to expose said target film, so that said target film have said required transmittance distribution; and developing said target film to form said light source compensating element.

2. The method as claimed in claim 1, wherein said characteristic curve is obtained by the following steps:
provding a reference film and a light source with adjustable brightness, said reference film has identical characteristics as said target film;
changing the brightness of said light source when exposing different areas of said reference film;
developing said reference film; and
measuring transmittance of said different areas of said reference film, thereby obtaining said characteristic curve.

3. A method of producing a light source compensating film for a scanner, the light source compensating film disposed between a light source of the scanner and the surface of an object such that the light source emitting light onto the scanning line of the surface of the object through the light source compensating film has a predetermined brightness distribution, the method comprising the steps of:
providing a first film and a characteristic curve thereof, the characteristic curve showing transmittance of the first film versus the brightness distribution of the light source after the first film is exposed and developed;
providing a second film identical to the first film to produce the light source compensating film;
determining the required transmittance distribution of the light source compensating film on the scanning line according to the predetermined brightness distribution formed on the scanning line of the surface of the object and the brightness distribution of the light from a light-radiating device, the light directly projected onto the scanning line;
changing the brightness of an adjustable and uniform light source to expose the light source compensating film according to the required transmittance distribution of the light source compensating film on the scanning line and the characteristic curve showing transmittance of the first film versus the brightness distribution of the light source; and
developing the exposed light source compensating film to make the light source compensating film obtain the predetermined transmittance distribution.

4. The method of producing a light source compensating film as claimed in claim 3, wherein the characteristic curve is obtained by the steps of:
providing a uniform light source with adjustable brightness and changing the brightness thereof to expose different areas of the first film under a predetermined time period; and
developing the exposed first film regularly to obtain the characteristic curve showing transmittance of the first film versus the brightness distribution of the light source.

5. A method of producing a light source compensating film for a scanner, the light source compensating film disposed between a light source of the scanner and the surface of an object such that the light source emitting light onto the scanning line of the surface of the object through the light source compensating film has a predetermined brightness distribution, the method comprising the steps of:
providing a first film and a characteristic curve thereof, the characteristic curve showing transmittance of the first film versus the brightness distribution of the light source after the first film is exposed and developed;
providing a second film identical to the first film to produce a target film;
determining the required transmittance distribution of the light source compensating film on the scanning line according to the predetermined brightness distribution formed on the scanning line of the surface of the object and the brightness distribution of the light from a light-radiating device, the light directly projected onto the scanning line;
changing the brightness of an adjustable and uniform light source to expose the target film according to the required transmittance distribution of the light source compensating film on the scanning line and the characteristic curve showing transmittance of the first film versus the brightness distribution of the light source; and
developing the exposed target film and disposing the developed target film between a uniform light source and the second film to produce the light source compensating film by means of controlling the brightness of the uniform light source and exposing time period.

6. The method of producing a light source compensating film as claimed in claim 5, wherein the characteristic curve is obtained by the steps of:
providing a uniform light source with adjustable brightness and changing the brightness thereof to expose different areas of the first film under a predetermined time period; and
developing the exposed first film regularly to obtain the characteristic curve showing transmittance of the first film versus the brightness distribution of the light source.

7. The method of producing a light source compensating film as claimed in claim 5, further comprising a step of:
using a uniform light source to pass through the exposed target film to expose a great number of films, whereby a great number of light source compensating films can be duplicated.

* * * * *